(12) United States Patent
Morales et al.

(10) Patent No.: US 8,330,972 B2
(45) Date of Patent: Dec. 11, 2012

(54) SYSTEM AND METHOD FOR REDUCING PRINT DELAYS FOR PRINT JOBS

(75) Inventors: Javier A. Morales, Rochester, NY (US); Michael E. Farrell, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 779 days.

(21) Appl. No.: 12/429,063

(22) Filed: Apr. 23, 2009

(65) Prior Publication Data

US 2010/0271656 A1 Oct. 28, 2010

(51) Int. Cl.
  *G06F 15/00* (2006.01)
(52) U.S. Cl. ........ 358/1.13; 358/450
(58) Field of Classification Search .......... None
  See application file for complete search history.

(56) References Cited

U.S. PATENT DOCUMENTS

| | | | | |
|---|---|---|---|---|
| 5,452,068 A * | 9/1995 | Farrell | | 399/367 |
| 5,870,696 A * | 2/1999 | Randolph | | 702/176 |
| 5,878,320 A | 3/1999 | Stemmle | | 399/384 |
| 7,391,529 B2 * | 6/2008 | Glaspy et al. | | 358/1.18 |
| 2003/0020944 A1 * | 1/2003 | Bhogal et al. | | 358/1.15 |
| 2005/0094175 A1 * | 5/2005 | Christiansen et al. | | 358/1.13 |
| 2008/0085487 A1 * | 4/2008 | Kuo et al. | | 433/24 |
| 2008/0192281 A1 * | 8/2008 | Hagiwara | | 358/1.15 |
| 2008/0316545 A1 * | 12/2008 | Tomita | | 358/450 |
| 2009/0080024 A1 * | 3/2009 | Liu et al. | | 358/1.16 |
| 2009/0324274 A1 * | 12/2009 | Bischel et al. | | 399/70 |

* cited by examiner

*Primary Examiner* — Twyler Haskins
*Assistant Examiner* — Helen Q Zong
(74) *Attorney, Agent, or Firm* — Kermit D. Lopez; Luis M. Ortiz; Kevin Soules

(57) ABSTRACT

Systems and methods for reducing delays in printing print jobs use a RIP or a digital front end generally, to maintain an inventory of pre-ripped ready to print work that can be sent to the print engine to prevent an engine shutdown due to the RIPs inability to keep up with the engine. The systems and methods for reducing delays in printing print jobs can track performance in real time and automatically switch to printing jobs from post-RIP content archive if it is determined that the print engine is at risk of outpacing the RIP or DFE such that printing will be interrupted at the print engine.

20 Claims, 5 Drawing Sheets

SYSTEM AND METHOD FOR REDUCING PRINT DELAYS FOR PRINT JOBS

BACKGROUND AND SUMMARY

The disclosed embodiments relate to methods and systems for printing print jobs and, more specifically but not exclusively, to methods and systems for printing jobs in electronic imaging printing systems in a manner that reduces delays in processing print jobs.

The terminology "imaging" refers to the entire process of putting an image (digital or analog source) onto paper.

Imaging printing systems utilize a raster image processor (RIP) that provides output data in a format that is suitable for printing by a printer. One suitable format is raw, binary dot patterns forming a bitmap. The raster image processor receives input of one or more page descriptions. The page descriptions include information about fonts, graphics, and the like that describe the appearance of each page. The page descriptions may be in a high level language or even another bitmap of higher or lower resolution than the output device. Some examples of high level page description languages are PostScript (PS), Portable Document Format (PDF) and Extensible Markup Language (XML) Paper Specification (XPS). The raster image processor may be implemented either as software, firmware, or hardware. Typically, the raster image processor resides in a digital front end (DFE). The raster image processor performs raster image processing (ripping). Raster image processing is the process of translating the page descriptions into a bitmap for output by the output device.

Imaging printing systems also generally provide for permanently fixing an image to a substrate, typically paper, by fusing, drying, or other means. The printing systems can include pre-cut sheet printing machines or continuous web feed printing machines. Printing systems that utilize pre-cut sheet machines are configured to print onto cut sheet substrates and typically include copy sheet paper paths through which copy sheets (e.g., plain paper), which are to receive an image, are conveyed and imaged. The process of inserting copy sheets into the copy sheet paper path and controlling the movement of the copy sheets through the paper path to receive an image on one or both sides is referred to as "scheduling". Copy sheets are printed by being passed through a copy sheet paper path (which includes a marking station) one or multiple times. Copy sheets which are printed on only one side (simplex copy sheets) in a single color usually pass through the copy sheet paper path a single time. Multipass printing is used to print images on both sides of a copy sheet (duplex printing), or to print a simplex sheet in multiple colors (one pass for each color).

On-line finishing devices can also be integrated with imaging systems. These on-line finishing devices directly receive copy sheets as they are outputted from the imaging system and perform various types of finishing operations on each copy sheet, or on each set of copy sheets. The finishing operations can be, for example: binding, stitching, folding, trimming, aligning, rotating, punching, drilling, slitting, perforating, and combinations thereof.

High speed printing of document images by xerographic, ionographic, ink jet or other copiers, printers, or other reproduction apparatus (encompassed by the word printers here) has become increasingly important and increasingly demanding in terms of quality, reliability, and other features.

For very high speed or high volume copying or printing, it is desirable to use a printing system that employs a continuous web print substrate. In web feeding, instead of feeding pre-cut sheets to be printed, the image substrate material is typically fed from large, heavy rolls of paper, which can be from paper mill rolls, and thus provided at a lower cost per printed page than pre-cut sheets. Each such roll provides a very large (very long) supply of paper printing substrate in a defined width. (Fan-fold or computer form web substrate can also be used in some limited printing applications, e.g. where edge sprocket hole feeding is desired.) Typically, with web roll feeding, the web is fed off the roll and through the xerographic or other print engine to be printed and thereafter cut in a chopper and/or slitter at or after the printer output to form the desired copy sheets. Alternatively, the printed web output can be rewound onto an output roll (uncut) for further processing off line.

Web paper has feeding and printing reliability and plural image registration advantages as compared to conventional precut sheets. That is, in addition to the cost advantages, web feeding can also have advantages in feeding reliability, i.e., lower misfeed and jam rates within the printer as compared to high speed feeding of precut sheets through a printing apparatus. A further advantage is that web feeding from large rolls requires less downtime for paper loading. For example, it is not uncommon for a system printing onto web paper from a 5 foot diameter supply roll to print continuously for an entire shift without requiring any operator action, compared to the need for an operator to re-load cut sheet feeders 2 to 3 times per hour on a typical cut sheet feeder system of equivalent speed. Continuous web printing also provides greater productivity for the same printer processing speed and corresponding paper path velocity through the printer since with web printing the images can be printed in direct sequence with no pitch space skips between images as is required between each sheet for cut sheet printing.

Web feeding is more suitable where the same substrate can be used for all or most of long runs of single sheet documents, or multi-page multiple print jobs in a printing run, all to be printed on the same substrate media. Quickly or easily changing between substrates is much more difficult with a web fed machine than a cut sheet machine. In a cut sheet machine, different sheets of different sizes, weights, colors, pre-prints, holes, etc. can be loaded into different paper feeding drawers and easily changed or substituted.

In view of ever increasing demand for efficient print production, it is desirable to minimize substrate wastage and avoid stoppages or shutdowns wherever possible. For very high speed continuous feed presses, even an orderly quick shutdown can waste dozens of feet of web media and may require a pre-print setup before paid content can be printed again.

There is a general need for printing systems and methods that can provide more efficient print production. It is believed that the methods and systems of the illustrative embodiments help meet this need.

SUMMARY

The following summary of the invention is provided to facilitate an understanding of some of the technical features related to techniques, apparatus and methods for reducing delays in printing print jobs and is not intended to be a full description. A full appreciation of the various aspects of the invention can be gained by taking the entire specification, claims, drawings, and abstract as a whole.

The aforementioned aspects of the invention and other objectives and advantages can now be achieved as described herein.

According to one aspect, a method for reducing delays in printing print jobs is described. The method is initiated by ripping first print job content using a raster image processor (RIP). First print job content received from the RIP can be printed using a print engine. Ripping performance data associated with ripping first print job content can be determined. Printing performance data associated with printing the first print job content can also be determined. A determination can be made based on the ripping and printing performance data as to whether the print engine is at risk of outpacing the RIP engine such that printing of the first job content will be interrupted. Ready-to-print second print job content can be provided. In response to a determination that the print engine is at risk of outpacing the RIP such that printing will be interrupted, the print engine can be switched from printing first print job content to printing the provided ready-to-print second print job content. Concurrent ripping of the first print job content and printing of the second print job content can be performed. In response to a determination that the RIP can keep pace with the print engine such that printing of the first print job can continue, the print engine can revert back to printing first print job content.

By switching from printing first job content to printing ready-to-print second job content in response to determining that the print engine is at risk of outpacing the RIP and reverting back to printing the first print job content when the RIP can keep pace with the print engine, print engine shutdowns can be avoided.

The method can further comprise tracking the ripping and printing performance data in real time; generating trend lines from the tracked ripping and printing performance data; and determining from the trendlines whether the print engine is at risk of outpacing the RIP. The method can further comprise displaying the generated trend lines on a display to indicate system status to a user.

The ready-to-print second print job content can be provided by, prior to ripping and printing the first print job content, ripping the second print job content, and further includes storing the second print job content in memory and retrieving the stored ready-to-print second content for printing by the print engine.

The determination that the RIP can keep pace with the print engine such that printing of the first job can continue can be made by determining a volume threshold of ripped first print job content which, if available to the print engine, would be sufficient to ensure that supply of the ripped first print job content to the print engine will not be exhausted by printing the first print job content; monitoring a volume of the ripped first job content available to the printing engine from the RIP; and determining that the monitored volume of ripped first job content available to the printing engine from the RIP has reached the pre-determined volume threshold.

According to another aspect, a system for reducing delays in printing print jobs is described. The system includes a raster image processor (RIP) configured to rip first print job content and a print engine configured to print first print job content received from the RIP. The print engine can be a continuous feed or web print engine. A controller can be operably coupled to the RIP and the print engine. The controller can be configured to determine ripping performance data associated with the RIP ripping first print job content, determine printing performance data associated with the print engine printing the first print job content, determine based on the ripping and printing performance data whether the print engine is at risk of outpacing the RIP such that printing will be interrupted, cause the print engine to switch from printing first print job content to printing the ready-to-print second print job content in response to determining that the print engine is at risk of outpacing the RIP such that printing will be interrupted, cause the RIP to rip first print job content whilst the print engine prints the second print job content, cause the print engine to revert back to printing first print job content in response to determining the RIP can keep pace with the print engine such that printing of the first job content can continue. The controller is further configured to track the ripping and printing performance data in real time; generate trend lines from the tracked ripping and printing performance data; and determine from the trend lines whether the print engine is at risk of outpacing the RIP.

According to yet another aspect, a computer program product is described. The computer program product comprises a computer-usable data carrier storing instructions that, when executed by a computer, cause the computer to perform a method for reducing delays in printing print jobs, the method comprising: ripping first print job content using a raster image processor (RIP); printing, using a print engine, first print job content received from the RIP; determining ripping performance data associated with ripping first print job content; determining printing performance data associated with printing the first print job content; determining based on the ripping and printing performance data whether the print engine is at risk of outpacing the print engine such that the printing will be interrupted; providing ready-to-print second print job content; in response to determining that the print engine is at risk of outpacing the RIP such that printing will be interrupted, switching from printing first print job content to printing the ready-to-print second print job content at the print engine, concurrently ripping the first print job content and printing the second print job content; and in response to determining that the RIP can keep pace with the print engine such that printing of the first print job can continue, reverting back to printing first print job content at the print engine.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment of the present invention and are not intended to limit the scope of the invention.

In the description herein, the terms "web" and "sheet" respectively refer to a flimsy physical elongate web, or cut sheet, of paper, plastic, or other suitable physical substrate for printing images thereon. A "job" or "print job" is normally one or more sets of related sheets, usually a collated copy set copied from a set of original document sheets or electronic document page images, from a particular user, or otherwise related. "Print content" or "Print Job Content" refers to print content of at least part of one or more print jobs. "Ready-to-print" refers to previously ripped for direct printing by the print engine. A "page image pipeline" refers to the chain of elements of the printing system arranged to transport the page image from the input to the output of the printing system.

As large digital continuous feed presses approach higher speeds, printing increasingly shorter runs can become extremely problematic. It is now appreciated that there are instances in which a DFE simply cannot RIP fast enough to keep up with the print engine which can occur even after a large amount of content as has been ripped before printing. When a page image pipeline gets starved for content, the print engine is often forced to do a quick shutdown (clutch) to prevent the waste of large amounts of paper. An orderly shutdown may still waste dozens of feet of web media. More importantly, a shutdown caused by lack of content will also require pre-print setup before paid content can be printed again. This involves waste of both large amounts of media and lost productivity.

Technical features described in this application can be used to construct various systems and method by which a RIP or a digital front end generally, maintains an inventory of pre-ripped ready to print work that can be sent to the print engine to prevent an engine shutdown due to the RIPs inability to keep up with the engine. The systems and methods of the illustrative embodiments can track performance in real time and automatically switch to printing jobs from post-RIP content archive if it is determined that the print engine is at risk of outpacing the RIP or DFE such that printing will be interrupted at the print engine.

Figure 1:
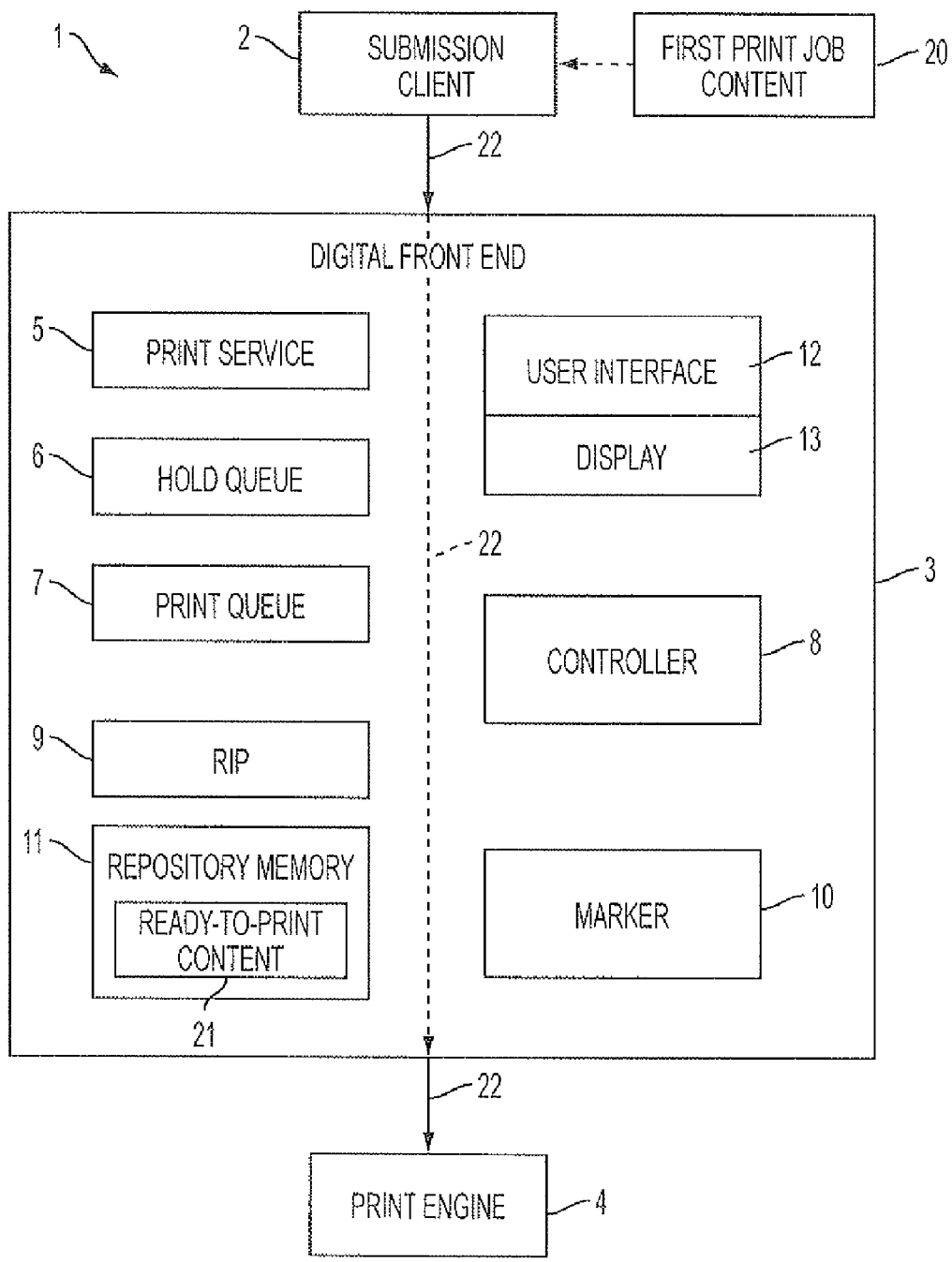
FIG. 1 illustrates a block diagram of a system for reducing delays in printing print jobs according to one embodiment.

FIG. 1 illustrates a networked printing system architecture according to an embodiment. Printing system 1 includes a raster image processing (Ripping) module or RIP processor 9 configured to raster image processor print jobs so that they are ready for printing and a print engine 4 configured to print the ripped jobs. The system also includes memory 11 storing pre-ripped print job content 21, that is, ready-to-print job content, that can be sent to the print engine to prevent an engine shutdown due to the raster image processor's inability to keep pace with the print engine. As will be explained in more detail below, a controller 8, operably coupled to the RIP 9 and print engine 4, is configured to cause the print engine 4 to switch from printing first print job content 20 to printing ready-to-print second print job content 21 in response to determining that the print engine is at risk of outpacing the RIP to the extent that printing of the first print job will be interrupted. Once controller 8 determines that the RIP 9 can keep pace with the print engine 4 such that the print engine can continue to print the first print job, controller 8 causes the print engine 4 to revert back to printing the first print job content 20.

By switching from printing first job content to printing ready-to-print second job content in response to determining that the print engine is at risk of outpacing the RIP, and reverting back to printing the first print job content when the RIP can keep pace with the print engine, jarring continuous feed print stops caused by a dry page pipeline can be prevented. Furthermore, this can prevent waste (materials, time, operator efforts) associated with an unwanted continuous feed print engine stop.

Turning now in more detail to the illustrative embodiment of the print system architecture of FIG. 1, controller 8 and RIP module 9 forms part of a digital front end (DFE) 3 which is configured to receive page descriptions (e.g., PDL files), such as from submission clients 2, over a network (not shown). The page image pipeline is the chain of elements from the submission client 2, to the DFE 3 including RIP 9, to the print engine 4 and is generally represented in FIG. 1 by the solid and dotted arrow 22. Submission clients 2 are one or more clients on the network that submit jobs for printing. Some examples of submission clients 2 include computers, scanners, copiers and other computing devices. Each submission client 2 includes a print driver (not shown). The print driver is typically embodied in software stored in memory on the submission client 2. The print driver compiles print job programming attributes (e.g., color attributes) and assembles the attributes and image data into page descriptions for a print job to be processed by the digital front end 3.

Digital front end utilizes the RIP module 9 to perform raster image processing (ripping) of the page descriptions for print jobs from the submission clients to produce bitmaps for rendering by the print engine 4. The digital front end 3 can perform other functions including creating and managing print queues 7, managing the print engine 4, and providing bitmaps to the print engine 4.

The print engine 4 is generally configured to perform the print imaging (or rendering), fixing, and paper transport to produce output images corresponding to the bitmaps. Output images may be transported to an output tray or stacker (not shown). The print engine 4 of the illustrative embodiment can be a continuous feed printer, a web printer, or any other printer which is generally configured to print output images onto continuous substrate. However, in alternative embodiments, other types of printers can be used which may include printers generally configured to print on cut substrates.

In the illustrative embodiment, the RIP module 9 is implemented in the form of software, hardware, or firmware that translates the page descriptions into a bitmap for output by the print engine 4. The bitmap may be stored in the memory which can be for example memory located in the DFE.

Ready-to-print print job(s) 21 that have been previously ripped is stored in a suitable memory 11 of the DFE or alternatively can be stored remotely and accessible by the DFE. Ready-to-print print job(s) can be for example stored in memory associated with the RIP itself. Memory can be an archive or repository memory, such as a memory of an evergreen repository.

The digital front end 3 may also include a hold queue 6, a print queue 7, a print service 5, and a marker 10. The system controller 8 includes a processor, memory and software, hardware and/or firmware (not shown) to generally manage the digital front end 3. For example, the system controller 8 determines which incoming jobs to hold and which jobs are ready to print. The system controller 8 may receive input from an operator using a user interface 12. For example, the operator may determine which job to print next. The system controller 8 dispatches jobs from the print queue 7 to the raster image processor 9. The system controller 8 can also monitor the state of the raster image processor 9, the marker 10, and the print engine 4.

The hold queue 6 and the print queue 7 may each be single queues or multiple queues. Both queues may be implemented as indexes into one queue. Alternatively, a job in the print queue 7 may simply have a held status without there actually being a hold queue 6. The digital front end 3 may include additional queues. Typically, the system controller 8 assigns jobs from submission clients 2 to the hold queue 6 and the operator schedules and releases jobs to the print queue 7. When a job is released to the print queue 7, the system controller 8 passes the released job to the raster image processor 9 for raster image processing.

The print service 5 is typically a software service running on the digital front end 3 that provides a selection of printing services to the submission clients 2 and receives incoming print jobs from the submission clients 2 over the network. The print service 5 may send incoming print jobs to the print queue 7 or the system controller 8. The print service 5 may include a user interface (not shown). The print service 5 may include one or more network submission gateways and one or more submission queues.

The marker 10 provides data and control information (e.g., font and color information) to the print engine 4 and sends binary RIP data to the print engine 4. The printer engine 4 and marker 10 may be combined into one module or component. The printer engine 4 renders an image based on the bitmap from the raster image processor 9 and the data and control information.

Turning now in more detail to the system controller 8, this is configured to monitor and gather operational information from the RIP 9 and print engine 4. In particular, RIP performance data associated with the throughput from the RIP to the print engine can be monitored and gathered by the controller. Similarly, printing performance data associated with the throughput of the print engine can be monitored and gathered by the controller.

As will be explained in more detail below, the controller 8 can track this RIP and print performance data in real time and generate trend lines. These trend lines can be used to determine whether the RIP 9 is at risk of outpacing the print engine 4. This determination can be implemented automatically by the controller itself or by the controller rendering the trend lines on a display of the user interface to an operator so that the operator is made aware of the overall system status and can take action as necessary. The controller 8 is configured to retrieve from repository memory 11 and provide to the print engine 4 the stored ready-to-print second print job content 21 such that the print engine can switch to printing the second job content.

Figure 2:
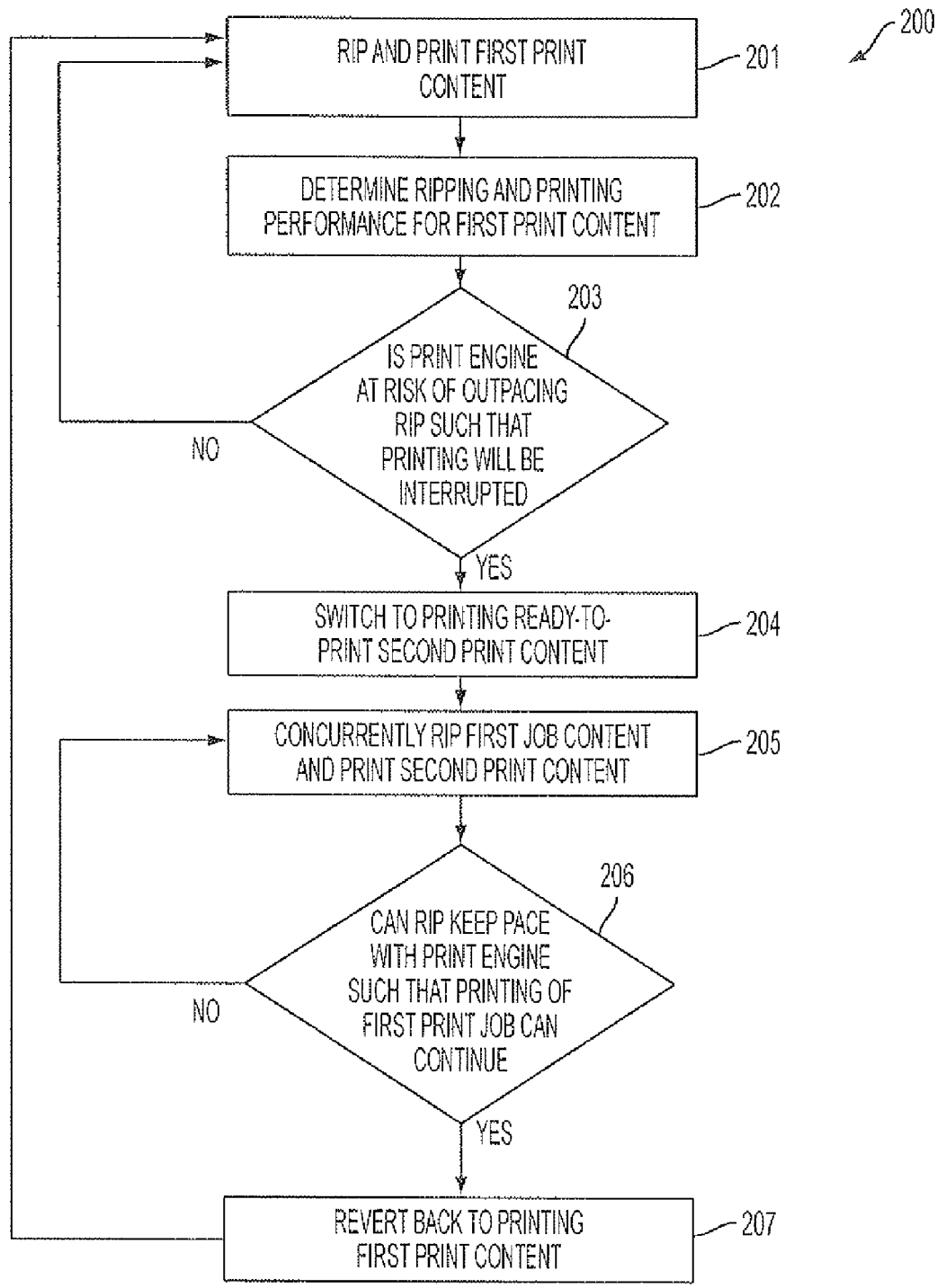
FIG. 2 illustrates a flow chart generally outlining a method of reducing delays in printing print jobs according to an embodiment.

Methods of reducing delays in printing print jobs according to various embodiments will now be described. Referring to FIG. 2, which illustrates a flow chart generally outlining method 200, the method is initiated by a raster image processor (RIP) ripping first print content and the print engine printing the first print content received from the RIP as indicated by process step 201. The raster image processing may be performed generally by the digital front end or specifically by the raster image processor. Ripping performance data associated with RIP ripping the first print content and printing performance data associated with printing first print job content from the RIP is determined, as shown in step 202. A determination is made based on the ripping and printing performance data as to whether the print engine is at risk of outpacing the RIP such that the printing of the first print job content will be interrupted, as shown in step 203.

The print engine effectively outpaces the RIP when the speed or throughput of the print engine outpaces the rate at which the RIP is able to provide page raster images to the print engine. This results in depletion of page raster images available to the print engine, that is, the page image pipeline from the RIP to the print engine begins to "dry up" and is effectively "starved" of page image content. Eventually, printing is interrupted because the print engine no longer has raster images available to print.

As indicated in step 203, if the RIP can keep pace with the print engine, the process returns to and continues from step 201 so that ripping and printing first print content continues.

If, however, the print engine is at risk of outpacing the rip such that printing is interrupted at the print engine, the print engine is switched from printing the first job content from the RIP to printing ready-to-print second print content, as shown in step 204. Concurrent ripping of the first print content and printing of the ready-to-print second print content is performed, as shown in step 205. Once it is determined that the RIP can sufficiently keep pace with the print engine to continue printing the first job content, as shown in step 206, the print engine reverts back to printing the first print content from the RIP as indicated in step 207. If, however, it is determined that the RIP cannot still keep pace with the print engine, the process returns to step 205 and the process continues therefrom by concurrent ripping of first job content and printing ready-to-print job content.

In order to explain method 200 in more detail, an example of implementing the method in system 1 for the purpose of reducing delays in printing a first print job and one or more second print jobs will now be described with reference to FIGS. 1 to 5.

Figure 3:
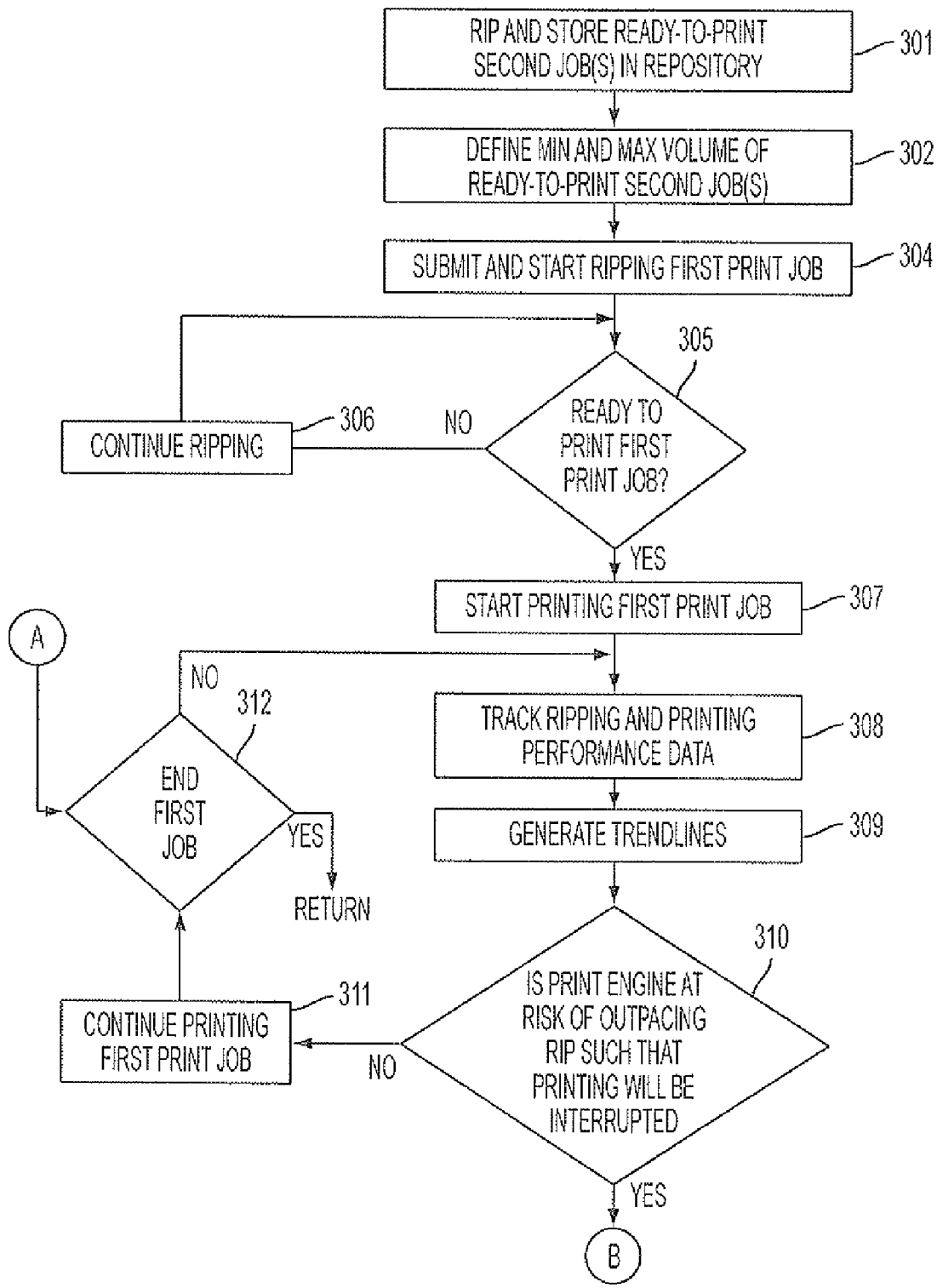
FIGS. 3 & 4 illustrate a flow chart showing a detailed example of the method of FIG. 2 implemented in the system of FIG. 1 according to one embodiment.
Figure 4:
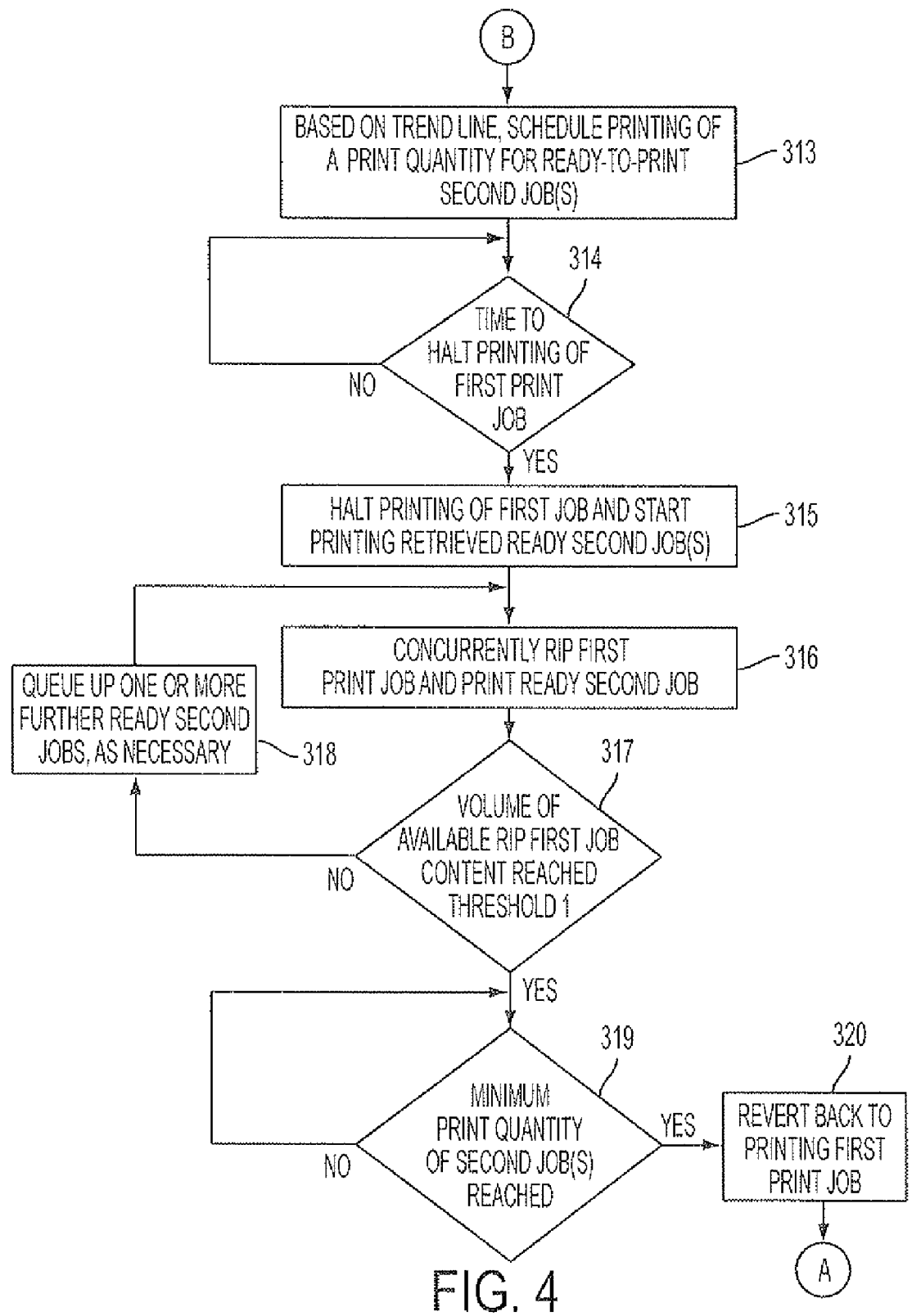

Referring in particular to FIGS. 3 & 4, which illustrate a flow chart of a more detailed example of method 200; one or more ready-to-print second print jobs are initially ripped and stored in repository memory 11 of the digital front end 3.

A print shop administrator or other user can instruct the DFE 3 via user interface 12 to rip and store a selection of work as ready-to-print content 21, as shown in step 301, which can be printed any time without a customer order. A minimum and maximum number of sets of ready-to-print second print job content 21 that is available to print can be defined, as shown in step 302. The availability of work can be defined for example when adding content to the repository memory 11. The minimum and maximum numbers could be either absolute or, more likely, be over a certain window of time. For example, the user may indicate that 10,000 sets of a given job may be printed on any given month. Print shops do tend to have certain documents for certain clients that the print shop knows will be ordered on a regular basis. Print shops "stock up" on these documents during slow times. This helps them with their delivery time, but more importantly, makes use of operators and equipment that would otherwise be idle. Method 200 provides a mechanism to take advantage of this behavior to solve performance problems that can impact production on continuous feed presses or other print engines.

A first print job 20 is then submitted and ripping initiated, as shown in step 304. For example, the user can submit the first print job 20 via the submission client 2 according to a customer order to the DFE 3. The RIP 9 continues to rip the first job until it is determined that the print engine 4 is ready to starting printing at least part of the first print job 20, as shown in steps 305 and 306. Printing of first print job content is then initiated, as shown in step 307. During ripping and printing, performance information, or data associated with the throughput of the RIP 9 and printing engine 4, respectively, is tracked, preferably in real time, as shown in step 308, to help determine whether the RIP is in danger of not keeping pace with the print engine 4 such that printing of the first job content 20 will be interrupted. This process can be implemented in system 1 by the controller 8 monitoring and collecting performance data from the RIP and print engine.

There are various ways of using RIP and print engine performance to determine whether the RIP or DFE is in danger of not keeping pace with the print engine.

Examples of printing and RIP performance data associated with the print engine and RIP are (i) running total of the number of pages that are waiting for print, (ii) rate at which pages are added to the waiting to print queue, and (iii) depletion rate of pages in the waiting to print queue.

In this particular example, trend lines based on the tracked RIP and printing performance data are generated, as shown in step 309, and, if necessary, displayed. System 1 can implement performance data tracking and construct the trend lines automatically. These trend lines can then be displayed to the user. For example, the trend lines can be displayed by rendering them on a display of the user interface to provide the use with the overall system status.

The trend lines are then used to determine whether the print engine 4 is at risk of outpacing the RIP 9 such that printing of the first print job will be interrupted, as shown in step 310. This can be achieved automatically by the controller or by the user. The system can warn the user when the overall trend indicates that the system 1 will need to take action to prevent a pause printing. When it is determined from the trend lines that the page pipeline will dry up unless action is taken, that is, that the print engine 4 will outpace the RIP 9 such that printing will be interrupted, the controller 8 can schedule printing of a print quantity for one or more ready-to-print jobs pre-stored in the repository memory, as shown in step 313 of FIG. 4. The controller 8, or user, can, if necessary, determine when it is time to halt printing of the first print job before switching to printing the ready-to-print second jobs pre-stored in the repository, as shown in step 314. In this manner, since the DFE 3 is taking action preemptively, it can ensure document integrity by inserting content at a logical boundary such as a set or a VI record. The DFE can also use offsets or other demarcation mechanisms to separate the ready-to-print content from the production work.

Retrieval and selection of ready-to-print second job(s) from the repository for printing by the print engine can be implemented in various ways. Content selection from the repository can be achieved using predefined rules. Some examples of rules are (i) select job that was reprinted last (print the same job until you fill the max quantity), (ii) select job that has not been printed for longest time, or (iii) select job using round robin on entire repository contents.

Once the print engine 4 has halted printing of the first job content 20, it begins printing the ready-to-print second jobs 21 that are selected and retrieved from the memory repository 11 by the controller and sent to the print engine for printing, as shown in step 315. Once printing content from the repository is initiated, the DFE concurrently rips the first job content until the page image pipeline has filled to a given threshold, that is, until the volume of raster page images of the first print job available to the print engine from the RIP or DFE has reached a predetermined threshold, as shown in step 317.

The DFE would use RIP trend information as well as things like plex and print quantities in order to estimate the volume threshold. This threshold depends on the rate of ripped page consumption (also known as the rate of pipeline depletion) caused by printing and the page replenishment rate as a result of the RIP supplying ripped pages to the print engine. These two rates can be combined to determine whether the system is heading towards pipeline starvation or not. Depletion/replenishment rates can be tracked and then used to provide an estimate for how long it would take the system to run out of pages to print at the current rates. This estimate can be used to estimate the volume threshold of rasterised first print job content that, if made available to the print engine, would be sufficient to ensure that supply of the ripped first print job content to the print engine will not be exhausted by printing the first print job content. Once the pipeline reaches the threshold, the DFE will continue producing the ready-to-print second job(s) document until a minimum print quantity is reached, as shown in step 319. At that point the DFE reverts to printing the production documents, which in this case is the first print job 20, as shown in step 320.

If necessary, the DFE 3 can queue up multiple ready-to-print second jobs as necessary, as shown in step 318, to ensure that printing of production first print jobs does not start until the desired threshold has been reached. To this end, one or more further ready second jobs can be queued up as necessary so that there is no interruption in printing ready-to-print job content whilst the RIP continues to rip the first job print content and the volume of ripped first job content available to the print engine continues to increase towards the pre-determined threshold 1.

Figure 5:
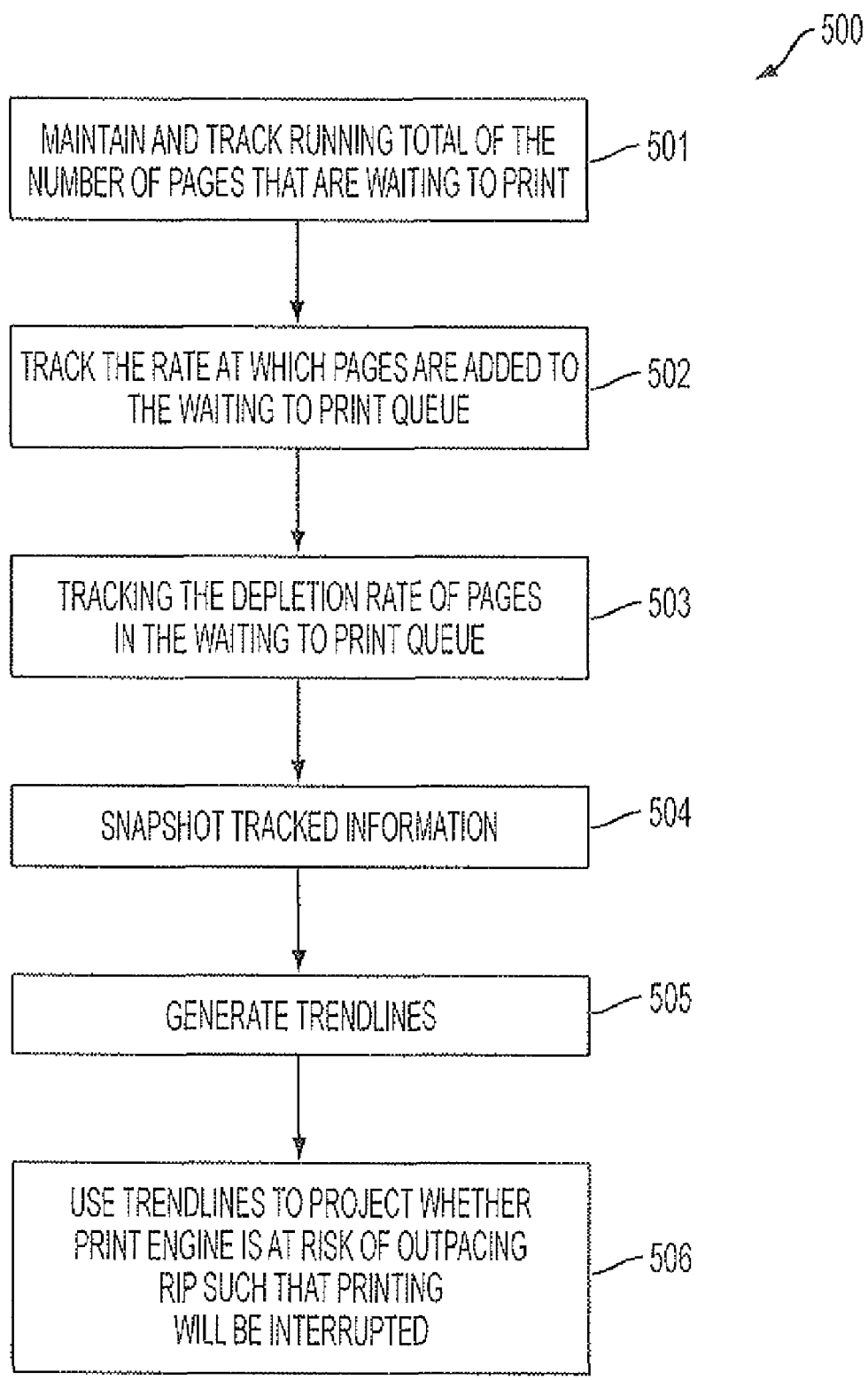
FIG. 5 illustrates a flow chart depicting an example of the process of determining ripping and printing performance data used in the method of FIGS. 3 & 4.

As already explained, there are various ways of using RIP and print engine performance to determine whether the RIP 9 or DFE 3 is in danger of not keeping pace with the print engine 4, as shown in step 310. FIG. 5 is a flow chart outlining one such method 500 according to an embodiment. A running total of the number of pages that are waiting for print is maintained, as shown in step 501. The rate at which pages are added to the waiting to print queue is tracked, as shown in step 502. The depletion rate of pages in the waiting to print queue is also tracked. Totals of number of pages waiting for print, added to print queue and depletion rate can be derived based on print quantities and plex and not just RIP pages. Process steps 501 to 503 can be performed in real time. Snapshots of the information tracked in steps 501 to 503 are performed, as shown in step 504, and used to generate real time trend lines, as shown in step 505. The trend lines are then used to determine when the page pipeline is likely to dry up, as shown in step 506. Method 500 can be implemented by system 1 of FIG. 1.

There is various other ways to predict whether the RIP 9 is in danger of not keeping track with the print engine 4. Statistics of ripping and printing performance data can be tracked instead of using trend lines (or they could be used to feed the trend lines). Ripping performance data associated with ripping first print job content can comprise any type of data or statistics reflecting the replenishment rate of ripped first print job content available to the print engine from the RIP. Similarly, printing performance data associated with printing the first print job content can comprise any type of data or statistics reflecting the depletion rate of the available ripped first print job content. The determination as to whether the print engine is at risk of outpacing the RIP such that said printing will be interrupted can be determined by tracking these depletion and replenishment rates and estimating if and when supply of the ripped first print job content to the print engine will be exhausted at current ripping and print rates, that is, when the pipeline will effectively "dry up".

The system and methods of the illustrative embodiments can determine if the print engine will outpace the RIP based on performance data tracked in real time and allow the DFE to predict in advance that it will not be able to keep up with the print engine. The DFE can automatically take action to ensure it has page images to drive the engine. An evergreen or other type of reprint repository of content can be printed without a customer order in quantities over a certain window of time. By printing a post-RIP repository of content when it has been determined that the RIP will outpace the print engine, engine shutdowns can be prevented. Automatic printing of jobs by the DFE can be performed using predefined rules. The systems and methods of the illustrative embodiments support common print shop practices and ensure that pages produced on the print engine are of value to the print shop.

It will be appreciated that various of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The claims, as originally presented and as possibly amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

The invention claimed is:

1. A method for reducing delays in printing print jobs, the method comprising:
   ripping first print job content using a raster image processor (RIP);
   printing, using a print engine, first print job content received from said RIP;
   determining ripping performance data associated with ripping first print job content;
   determining printing performance data associated with printing said first print job content;
   determining based on said ripping and printing performance data whether the print engine is at risk of outpacing the RIP such that said printing will be interrupted;
   selecting ready-to-print from a repository according to a plurality of predefined rules;
   providing ready-to-print second print job content;
   in response to determining that the print engine is at risk of outpacing said RIP such that printing will be interrupted, switching from printing first print job content to printing said ready-to-print second print job content at said print engine;
   separating said first print job from said second print job with an offset;
   concurrently ripping said first print job content and simultaneously printing said second print job content; and
   in response to determining that the RIP can keep pace with the print engine such that printing of the first print job can continue, reverting back to printing first print job content at said print engine.

2. The method of claim 1, further comprising tracking said ripping and printing performance data in real time;
   generating trend lines from said tracked ripping and printing performance data; and
   determining from said trend lines whether said print engine is at risk of outpacing said RIP.

3. The method of claim 2, further comprising displaying said generated trend lines on a display to indicate system status to a user.

4. The method of claim 2, wherein tracking said ripping and printing performance data in real time comprises:
   maintaining a running total of the number of pages that are waiting for print;
   tracking the rate at which pages are added to the waiting to print queue; and
   tracking the depletion rate of pages in the waiting to print queue.

5. The method of claim 1, wherein determining ripping performance data associated with ripping first print job content comprises tracking a replenishment rate of ripped first print job content supplied to said print engine from said RIP;
   wherein determining printing performance data associated with printing said first print job content comprises tracking a depletion rate of said supplied ripped first print job content; and
   wherein determining based on said ripping and printing performance data whether the print engine is at risk of outpacing the RIP such that said printing will be interrupted comprises determining from said depletion and replenishment rates whether supply of said ripped first print job content to said print engine will be exhausted at current ripping and printing rates.

6. The method of claim 1, wherein providing said ready-to-print second print job content includes, prior to ripping and printing said first print job, ripping said second print job content, and further includes storing said second print job content in memory and retrieving said stored ready-to-print second content for printing by said print engine.

7. The method of claim 1, wherein providing said ready-to-print second print job content includes selecting and using predefined rules of said ready-to-print second print content from ready-to-print content previously stored in a reprint archive or repository, wherein said ready-to-print rules comprise at least one of:
   select job that was reprinted last;
   select job that has not been printed for longest time; and
   select job using round robin selection on entire repository content.

8. The method of claim 1, wherein determining that said RIP can keep pace with the print engine such that printing of said first print job content can continue, comprises:
   determining a volume threshold of ripped first print job content which, if available to said print engine, would be sufficient to ensure that supply of said ripped first print job content to said print engine will not be exhausted by printing said first print job content;
   monitoring a volume of said ripped first job content available to the printing engine from the RIP; and
   determining that said monitored volume of ripped first job content available to the printing engine from the RIP has reached said pre-determined volume threshold.

9. The method of claim 8, further comprising, in response to automatically determining said volume of ripped first job content available to the printing engine from the RIP has reached said pre-determined threshold, automatically continuing to print a minimum quantity of said second print job content, and wherein reverting back to printing first print job content is performed automatically once said minimum print quantity of second print job content is reached.

10. The method of claim 8, wherein said ready-to-print second print job content comprises multiple ready-to-print jobs and further comprising queuing up and printing said multiple ready-to-print jobs such that the volume of ripped first job content available to the printing engine from the RIP can reach said pre-determined threshold without an interruption in printing of said second print job content.

11. A system for reducing delays in printing print jobs, the system including:
   a raster image processor (RIP) configured to rip first print job content;
   a print engine configured to print first print job content received from said RIP;
   a controller, operably coupled to said RIP and said print engine, said controller being configured to:
      determine ripping performance data associated with said RIP ripping first print job content;
      determine printing performance data associated with said print engine printing said first print job content;

determine based on said ripping and printing performance data whether the print engine is at risk of outpacing the RIP such that printing will be interrupted, select a ready-to-print second print job content from a repository according to a plurality of predefined rules;

cause said print engine to switch from printing first print job content to printing said ready-to-print second print job content in response to determining that the print engine is at risk of outpacing said RIP such that printing will be interrupted;

separating said first print job from said second print job with an offset;

cause said RIP to raster image process first print job content while said print engine prints said second print job content; and cause said print engine to revert back to printing first print job content in response to determining said RIP can keep pace with said print engine such that printing of said first job content can continue.

12. The system of claim 11, wherein said controller is further configured to track said ripping and printing performance data in real time, generate trend lines from said tracked ripping and printing performance data, and determine from said trend lines whether said print engine is at risk of outpacing said RIP.

13. The system of claim 11, wherein said print engine comprises a continuous feed or continuous web printer.

14. The system of claim 11, wherein said controller is configured to:

retrieve pre-stored ready-to-print second job content from memory; and provide to said print engine said stored ready-to-print second print job content such that said print engine can switch to printing said second job content.

15. The system of claim 14, wherein said system is configured to:

determine a volume threshold of ripped first print job content, which if available to said print engine, would be sufficient to ensure that supply of said ripped first print job content to said print engine will not be exhausted by printing said first print job content;

monitor a volume of said ripped first job content available to the printing engine from the RIP; and determine that said monitored volume of ripped first job content available to the printing engine from the RIP has reached said pre-determined threshold.

16. A computer program product comprising a non-transitory computer-usable data carrier storing instructions that, when executed by a computer, cause the computer to perform a method for reducing delays in printing print jobs, the method comprising:

ripping first print job content using a raster image processor (RIP);

printing, using a print engine, first print job content received from said RIP;

determining ripping performance data associated with ripping first print job content;

determining printing performance data associated with printing said first print job content;

determine based on said ripping and printing performance data whether the print engine is at risk of outpacing the RIP such that said printing will be interrupted;

provide ready-to-print second print job content;

in response to determining that the print engine is at risk of outpacing said RIP such that printing will be interrupted, switching from printing first print job content to printing said ready-to-print second print job content at said print engine;

concurrently ripping said first print job content and printing said second print job content; and in response to determining that the RIP can keep pace with the print engine such that printing of the first print job can continue, reverting back to printing first print job content at said print engine.

17. The method of claim 16, further comprising tracking said ripping and printing performance data in real time;

generating trend lines from said tracked ripping and printing performance data; and determining from said trend lines whether said print engine is at risk of outpacing said RIP.

18. The method of claim 16, wherein providing said ready-to-print second print job content includes, prior to ripping and printing said first print job, ripping said second print job content, and further includes storing said second print job content in memory and retrieving said stored ready-to-print second content for printing by said print engine.

19. The method of claim 16, wherein determining that said RIP can keep pace with the print engine such that printing of said first print job content can continue comprises:

determining a volume threshold of first print job content, which if available to said print engine, would be sufficient to ensure that supply of said ripped first print job content to said print engine will not be exhausted by printing said first print job content;

monitoring a volume of said ripped first job content available to the printing engine from the RIP; and determining that said monitored volume of ripped first job content available to the printing engine from the RIP has reached said pre-determined threshold.

20. The method of claim 16, further comprising, in response to automatically determining said volume of ripped first job content available to the printing engine from the RIP, has reached said pre-determined threshold, automatically continuing to print a minimum quantity of said second print job content, and wherein reverting back to printing first print job content is performed automatically once said minimum print quantity of second print job content is reached.

* * * * *